United States Patent

Shimada et al.

(10) Patent No.: US 7,445,348 B2
(45) Date of Patent: Nov. 4, 2008

(54) REFLECTOR, USE THEREOF, AND METHOD FOR PRODUCING REFLECTOR

(75) Inventors: Koichi Shimada, Sodegaura (JP); Katsuhiko Koike, Sodegaura (JP); Shin Fukuda, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 281 days.

(21) Appl. No.: 10/555,418

(22) PCT Filed: May 17, 2004

(86) PCT No.: PCT/JP2004/006987

§ 371 (c)(1),
(2), (4) Date: Nov. 3, 2005

(87) PCT Pub. No.: WO2004/102231

PCT Pub. Date: Nov. 25, 2004

(65) Prior Publication Data

US 2006/0262436 A1    Nov. 23, 2006

(30) Foreign Application Priority Data

May 15, 2003  (JP) .............................. 2003-138018

(51) Int. Cl.
  *G02B 5/08*    (2006.01)
(52) U.S. Cl. ........................ 359/883; 359/900; 359/584
(58) Field of Classification Search ................. 359/584, 359/883, 884, 900; 349/113; 362/296, 341
  See application file for complete search history.

(56) References Cited

U.S. PATENT DOCUMENTS

| 4,340,646 | A  | * | 7/1982  | Ohno et al. ................. 428/429 |
| 4,645,714 | A  | * | 2/1987  | Roche et al. ................ 428/458 |
| 5,276,600 | A  |   | 1/1994  | Takase et al. |
| 5,982,546 | A  | * | 11/1999 | Kawamoto et al. .......... 359/584 |
| 6,520,650 | B2 | * | 2/2003  | Fraizer ....................... 359/514 |
| 2002/0008914 | A1 | * | 1/2002  | Tatsumi ..................... 359/584 |
| 2005/0068648 | A1 | * | 3/2005  | Yoshikai et al. ............. 359/883 |

FOREIGN PATENT DOCUMENTS

| EP | 516489 A2 | 12/1992 |
| JP | 61-185986 A | 8/1986 |
| JP | 64-076788 A | 3/1989 |
| JP | 1-310302 A | 12/1989 |
| JP | 07-032537 A | 2/1995 |
| JP | 7-191317 A | 7/1995 |
| JP | 11-002707 A | 1/1999 |
| JP | 2000-221311 A | 8/2000 |
| JP | 2002-055213 A | 2/2002 |
| JP | 2002-116313 A | 4/2002 |

* cited by examiner

*Primary Examiner*—Ricky D Shafer
(74) *Attorney, Agent, or Firm*—Buchanan Ingersoll & Rooney PC

(57) ABSTRACT

A reflector having a structure in which a high refractive index layer, a low refractive index layer, and a metal layer mainly composed of silver or aluminum are sequentially arranged on a polymer base. The reflector can realize a higher reflectance than the conventional reflective bodies by using a polymer base wherein the atoms measured by XPS which constitute the surface of the polymer base are substantially identical with those constituting the inside of the polymer base. Furthermore, such a reflector can be used for a reflector, a reflector under a light-guiding plate, a backlight device and a liquid crystal display. The polymer base can be obtained by bringing a polymer base and a liquid into contact with each other.

8 Claims, 5 Drawing Sheets

REFLECTOR, USE THEREOF, AND METHOD FOR PRODUCING REFLECTOR

TECHNICAL FIELD

The present invention relates to a reflector with a metal selected from silver or aluminum laminated on a polymer base. More specifically, the invention relates to a reflector having a configuration of a polymer base, a high refractive index layer, a low refractive index layer, a metal layer mainly composed of silver or aluminum. Furthermore, the invention relates to a lamp reflector, a reflector under a light-guiding plate, a backlight device and a liquid crystal display using the reflector.

BACKGROUND ART

In recent years, a thin film which uses silver or aluminum as a reflector has been used as a lamp reflector for a backlight of a liquid crystal display, as well as a reflection umbrella for the fluorescent lamp and the like. Such a reflector is a reflective board having a structure of a silver or aluminum thin film layer/an adhesive layer/an aluminum plate or a so-called reflective sheet having a structure of a silver or aluminum thin film layer/a white coating/an adhesive layer/an aluminum deposition layer/a polymer film/a white coating, which has been reported, for example, in Japanese Patent No. 2503160, JP1995-32537A, JP2002-116313A, JP2000-221311A and the like.

In recent years, with high pixel number of a liquid crystal display, enhancement of luminance for a backlight has been in demand. Here, as a method for increasing a luminance for a backlight, use of a reflector with a high reflectance capable of entirely using light from a light source can be cited. At present, although a reflector using a silver thin film layer has been properly used, a reflector having much higher reflectance has been demanded from the market.

Although silver has a high reflectance as a single film, the cost of silver itself is expensive so that there is a problem in the cost. Accordingly, a reflector using an aluminum thin film with a cheap price instead of silver has been used for a lamp reflector for a backlight of a liquid crystal display as well. However, since aluminum has a lower reflectance than silver, enhancement of the reflectance of a reflector using an aluminum thin film layer has been in demand.

When a low refractive index layer and a high refractive index layer are laminated on a metal layer at an appropriate thickness, it has been known, in theory, that a reflection-increasing film is obtained. Since this reflection-increasing film can be a reflector having a higher reflectance as compared to a single body of metal, it is considered possible to respond to the aforementioned market demand. As a substrate of this reflection-increasing film, glass has been conventionally used. There has been disclosed a reflector for a laser, for example, in JP1986-185986A, JP1989-76788A or the like. However, when such glass is used as a substrate, there are problems in the processability such that a reflector cannot be bent and in the productivity such that a roll-to-roll production is not possible. In order to solve the problems, a reflection-increasing film having a polymer film as a substrate has been needed.

A reflection-increasing film using a polymer base has been disclosed, for example, in JP1999-2707A, JP2002-55213A and the like. However, an effect of increased reflectance of their reflector is relatively small so that a reflector having much higher reflectance has been in demand.

DISCLOSURE OF THE INVENTION

The present inventors have found a phenomenon that for a reflection-increasing film using a polymer base, the reflectance becomes 1% or more lower than a reflection-increasing film using a glass substrate. Accordingly, an object of the present invention is to provide a reflector having a very high reflectance even when a polymer base is used, or various products using the same reflector.

In order to achieve the above object, the present inventors have conducted an extensive study. As a result, they have found that in a silver or aluminum single-layered film, the reflectance is not lowered even when a polymer base is used, while this problem is specific to a reflection-increasing film, and surprisingly enough, performance of the above reflection-increasing film is greatly influenced by the atomic composition of the polymer base surface and the atomic composition of the polymer base. They have also found a composition of a polymer base capable of achieving the above object and a means for realizing such a composition. Thus, the present invention has been completed. That is, the present invention relates to a reflector having a laminate structure of at least a high refractive index layer (A), a low refractive index layer (B), a metal layer (C) mainly composed of a metal selected from silver or aluminum, and a polymer base (D), wherein the layer (A), the layer (B) and the layer (C) are laminated in the order of (A)/(B)/(C), and wherein the polymer base (D) satisfies the following condition (I), (I) the content (Rn) of atoms of the same elements as elements (A2) (excluding metals) in elements (A1) (excluding metals) relative to the elements (A1) is not less than 98.0 atomic %, wherein the elements (A1) are observed by the XPS measurement of portion at depths of 0 nm to 10 nm from a side of the reflective layer of the polymer base (D) and the elements (A2) are observed by the XPS measurement of portion at depths of 50 nm to 10 μm from a side of the reflective layer of the polymer base (D). According to the present invention, a reflector having a very high reflectance can be obtained.

Furthermore, the polymer base (D) is preferably a polymer film. By having such a polymer film, the processability and the productivity of the reflector can be enhanced.

Furthermore, the present invention relates to a lamp reflector using the aforementioned reflector. According to the present invention, a lamp reflector having a very high reflectance can be obtained so that it is possible to realize a display device with a high luminance, an energy-saving display device or the like.

Furthermore, the present invention relates to a reflector under a light-guiding plate using the aforementioned reflector. According to the present invention, a reflector under a light-guiding plate having a very high reflectance so that it is possible to realize a display device with a high luminance, an energy-saving display device or the like.

Furthermore, the present invention relates to a backlight device using the aforementioned reflector. According to the present invention, it is possible to realize a backlight device with a high luminance, or an energy-saving backlight device or the like.

Furthermore, the present invention relates to a liquid crystal display using the aforementioned reflector. According to the present invention, it is possible to realize a liquid crystal display with a high luminance, an energy-saving liquid crystal display or the like.

Furthermore the present invention relates to a method for producing the reflector wherein a reflective layer having a laminate structure of a high refractive index layer (A), a low refractive index layer (B),.and a metal layer (C) mainly composed of a metal selected from silver or aluminum is formed on a polymer base (D1) satisfying the following condition (II) in the order of (A)/(B)/(C), (II) the content ($Rn_1$) of atoms of the same elements as elements (A21) (excluding metals) in elements (A11) (excluding metals) relative to the elements (A11) is not less than 98.0 atomic %, wherein the elements (A11) are observed by the XPS measurement of the surface forming a reflective layer of the polymer base (D1) and the elements (A21) are observed by the XPS measurement of portion at depths of 50 nm to 10 μm from a side of the reflective layer of the appropriate surface of the polymer base (D1).

The aforementioned polymer base (D1) is preferably a polymer bases (D2) in which a polymer base and a liquid are subjected to coming into contact with each other.

According to the present invention, a reflector with a very high reflectance which is considered very high due to the high reflection-increasing effect can be effectively produced.

BEST MODE FOR CARRYING OUT THE INVENTION

Figure 1:
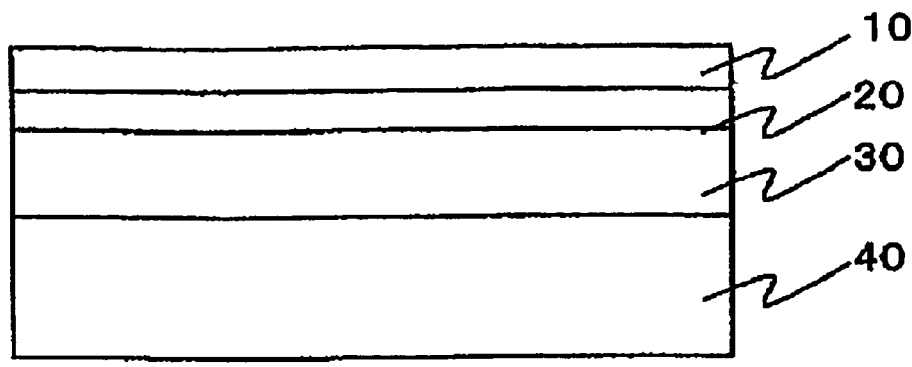
FIG. 1 is a cross-sectional view illustrating one embodiment (1) of a reflector according to the present invention..

The present invention will be described in more detail below.

The reflector of the present invention has a structure wherein a polymer base (D) and a reflective layer are laminated, while the reflective layer has a structure wherein a high refractive index layer (A), a low refractive index layer (B), a metal layer (C) mainly composed of a metal selected from silver or aluminum are laminated in the order of (A)/(B)/(C).

(High Refractive Index Layer (A))

A high refractive index in the present invention refers to a refractive index of not less than 1.70 and not more than 4.00. However, a high refractive index layer that has been generally used has a refractive index of not less than 2.00 and not more than 3.00. Here, the refractive index can be measured by an ellipsometer.

As the high refractive index layer (A) according to the present invention, titanium oxide, zinc sulfide, cerium oxide, indium oxide, neodymium oxide, tin oxide, yttrium oxide, niobium oxide, bismuth oxide, an alloy of indium oxide and tin oxide, an alloy of indium oxide and cerium oxide, and the like are preferably used. However, examples thereof are not particularly restricted thereto. Either of inorganic materials or organic materials can be used.

(Low Refractive Index Layer (B))

A low refractive index in the present invention refers to a refractive index of not less than 1.20 and not more than 1.80. However, a low refractive index layer that has been generally used has a refractive index of not less than 1.30 and not more than 1.60. Here, the refractive index can be measured by an ellipsometer.

As the low refractive index layer (B) according to the present invention, silicon oxide, calcium fluoride, sodium fluoride compound, lithium fluoride, magnesium fluoride, lanthanum fluoride, neodymium fluoride, aluminum oxide, cerium fluoride and the like are preferably used. However, examples thereof are not particularly restricted thereto. Either of inorganic materials or organic materials can be used.

(Metal Layer Mainly Composed of a Metal Selected from Silver or Aluminum)

As for a metal layer (C) mainly composed of a metal selected from silver or aluminum, a single body of silver or aluminum, or an alloy mainly composed of silver or aluminum is preferably used. A purity of a single body of silver or aluminum is preferably 100%, whereas the single body of silver or aluminum actually contains a little of hetero atom such as oxygen, sulfur or the like, or other metals in some cases. For this reason, in the present invention, a single body of silver or aluminum is defined as one with a purity of more than 99.99 weight %. On the other hand, an alloy mainly composed of silver or aluminum refers to one containing a metal such as gold, copper, nickel, iron, cobalt, tungsten, molybdenum, tantalum, chrome, indium, manganese, titanium, palladium, neodymium, cadmium, antimony, tin, zinc, niobium, bismuth and the like in silver or aluminum.

The ratio of other metals or the like different from the above silver or aluminum is preferably not less than 0.01 weight % and not more than 20.0 weight % in consideration of the reflectance. When the content of impurities is within this range, the aforementioned silver alloy may have enhanced durability by its combination in some cases. Concrete examples of the silver alloy include, though not restricted to, an alloy composed of silver and gold, an alloy composed of silver and copper, an alloy composed of silver and nickel, an alloy composed of silver and palladium, an alloy composed of silver and neodymium, an alloy composed of silver and indium, an alloy composed of silver and tin, an alloy composed of silver and tungsten, an alloy composed of silver and titanium, an alloy composed of silver and chrome, an alloy composed of silver, palladium and copper, an alloy composed of silver, palladium and gold, an alloy composed of silver, neodymium and gold, an alloy composed of silver, neodymium and copper, an alloy composed of silver, indium and tin, an alloy composed of silver and bismuth, and the like. As for the aluminum alloy, alloys combined with the aforementioned elements can be used.

(Method for Preparing a Reflective Layer)

A high refractive index layer (A), a low refractive index layer (B), and a metal layer (C) mainly composed of a metal selected from silver or aluminum can be preferably formed by using a vacuum film-forming method. Concrete examples of the vacuum film forming method include a deposition method, an ion beam deposition method, an ion plating method, a sputtering method, and a chemical vapor deposition. In particular, the ion plating method or the sputtering method is properly used. In the ion plating method, a desired metal or a sintered material is resistance heated in reactive gas plasma or heated by the electron beam for conducting the vacuum deposition. In the sputtering method, a desired metal or a sintered material is used as a target. An inert gas such as argon, neon, krypton, xenon or the like can be used as a sputtering gas, of which argon is preferably used. The purity of the gas is preferably not less than 99% and more preferably not less than 99.5%. The sputtering can be carried out by adding a gas necessary for the reaction (a reactive gas) thereto. As the aforementioned reactive gas, a known gas can be selected as needed and used accordingly. Representative examples of the reactive gas concretely include oxygen, hydrogen or the like. Incidentally, the direct current sputtering method is generally used when forming a conductive thin film, while the high frequency sputtering method is used when forming an insulating thin film in many cases.

In the present invention, to form the low refractive index thin film layer (B) positioned on the metal layer (C) mainly composed of silver or aluminum, it is preferable to carry out the vacuum film-forming under an atmosphere without containing oxygen in some cases. Here, an atmosphere without containing oxygen means that the ratio of partial pressure of the oxygen component occupied in the film-forming gas is not more than 0.9%. For example, when a film made of a metal oxide is formed in an atmosphere containing oxygen, a relatively thick metal oxide thin film layer containing silver in the film is formed so that unique high light transmittance that must be owned by the above low refractive index thin film layer (B) is lost in some cases.

In the present invention, a boundary area between the metal layer (C) and the low refractive index thin film layer (B), namely, an area in which both layers coexist with each other is generated in some cases. The thickness of the area is preferably as thin as possible. As its configuration, when the low refractive index thin film layer (B) is a thin film layer comprising a metal oxide, the thickness of a portion in which the content of a metal derived from (C) is from 10 to 90 atomic % is preferably not more than 15 nm, more preferably from 0.1 to 15 nm and further preferably from 0.1 to 10 nm, based on the numerical sum of an atom of a metal derived from (C) and a metal derived from (B). The above composition and thickness are determined by analysis in the depth direction using XPS in the present invention.

On the other hand, as a method for forming the high refractive index thin film layer (A), a method for forming a metal oxide in the presence of oxygen in a proper amount by the vacuum film-forming method is preferable in some cases. For example, a method for forming a titanium oxide thin film layer in the presence of oxygen using a titanium oxide by the vacuum film-forming method can be cited.

(Thickness of Each Layer)

A thickness of the metal layer (C) mainly composed of a metal selected from silver or aluminum is preferably not less than 50 nm and not more than 1000 nm. The thickness is more preferably not less than 80 nm and not more than 1000 nm, and further preferably not less than 100 nm and not more than 1000 nm. When the thickness of the aforementioned layer is not less than 100 nm, the reflectance of the metal layer hardly changes, whereas when the thickness of the layer becomes more than 1000 nm, there is a problem of increasing the cost in some cases. When the layer has a thickness of less than 50 nm, a light transmits the metal layer so that the reflectance is lowered in some cases.

A film thickness of the low refractive index layer (B) cannot be uniformly defined because it is different depending on the wavelength area enhancing the reflectance or the refractive index of a substance forming the low refractive index layer. However, in the present invention, it is preferably not less than 20 nm and not more than 200 nm, and more preferably not more than 150 nm. In general, the thickness of the low refractive index layer is preferably $\lambda/4n_L$ for exhibiting a reflection-increasing effect when a wavelength of a light to be set is defined as $\lambda$ and a refractive index is defined as $n_L$. However, in the present invention, it is preferably about $\lambda/8n_L$ in some cases. Accordingly, in order to enhance the total light reflectance at a wavelength of 550 nm, the film thickness is more preferably not less than 25 nm and not more than 120 nm, and further preferably not less than 25 nm and not more than 115 nm. On the other hand, a high reflectance may be needed for a light at a wavelength of 450 nm or 650 nm in some cases. In order to enhance the total light reflectance at a wavelength of 450 nm, the film thickness is more preferably not less than 20 nm and not more than 110 nm, and further preferably not less than 20 nm and not more than 95 nm. Furthermore, in order to enhance the total light reflectance at a wavelength of 650 nm, the film thickness is preferably not less than 30 nm and not more than 200 nm, more preferably not less than 30 nm and not more than 150 nm, further preferably not less than 30 nm and not more than 145 nm, and the most preferably not less than 30 nm and not more than 140 nm. Incidentally, a light at the aforementioned wavelengths of 550 nm and 450 nm is greatly related to visibility so that it is a highly important light.

A film thickness of the high refractive index layer (A) cannot be uniformly defined either because it is different depending on the wavelength area which enhances the reflectance. However, in general, it is preferably not less than 20 nm and not more than 120 nm. In order to enhance the total light reflectance at a wavelength of 550 nm, the film thickness is more preferably not less than 25 nm and not more than 90 nm, and further preferably not less than 30 nm and not more than 80 nm. In order to enhance the total light reflectance at a wavelength of 450 nm, the film thickness is more preferably not less than 20 nm and not more than 80 nm, and further preferably not less than 25 nm and not more than 65 nm. Furthermore, in order to enhance the total light reflectance at a wavelength of 650 nm, the film thickness is more preferably not less than 30 nm and not more than 100 nm, and further preferably not less than 40 nm and not more than 95 nm.

Furthermore, as a method for measuring the film thickness of the aforementioned respective layers, there are methods using a stylus roughness tester, a multiple-beam interferometer, a microbalance, a quartz oscillator method or the like. Among other things, the quartz oscillator method is particularly appropriate for obtaining a desired film thickness, since it can measure a film thickness while a film is being formed. Furthermore, there is also a method in which film forming conditions are preliminarily set, the film is formed on a sample base material under the thus-set conditions, a relationship between a film forming time and a film thickness is determined and, then, the film thickness is controlled by the film forming time.

Values of the film thickness determined by these methods are not completely the same, but its difference is about several nanometers, which can be considered within the range of tolerance.

(Polymer Base)

In the present invention, as for polymer bases (D), (D1), and (D2) (hereinafter referred to as a polymer base in short in some cases), for example, polyesters such as polyethylene terephthalate (PET) and the like, polycarbonates such as bisphenol A type polycarbonate and the like are preferably used. Examples thereof are not restricted thereto. A plate, sheet, film or the like comprising various plastics including polyolefins such as polyethylene, polypropylene and the like, cellulose derivatives such as cellulose triacetate and the like, vinyl type resin such as poly vinylindene chloride and the like, polyimides, polyamides, polyether sulfone, polysulfone type resin, polyalylate type resin, fluorine type resin and the like may also be good, while any materials with high common heat resistance temperature can be used. When such materials with high heat resistance are used, it is needless to say that a reflector which can be used at a high temperature is obtained. Polyesters such as PET and the like, polycarbonates such as bisphenol A type polycarbonate and the like having constituent elements of carbon, oxygen, and hydrogen are more preferable. Furthermore, an additive such as a heat resistant stabilizer, an anti-oxidant agent or the like containing other elements may be naturally contained in the polymer base having constituent elements of carbon, oxygen and hydrogen.

As the polymer base according to the present invention, a polymer film is preferable from the viewpoints of high degree of freedom in molding processability for molding in various shapes, high productivity capable of applying a roll-to-roll process and the like.

The thickness of the polymer base in the present invention is not particularly restricted. When a polymer film is used as the polymer base, the thickness thereof is preferably from 10 to 250 µm, more preferably from 10 to 200 µm, and further preferably from 20 to 200 µm. When the polymer base is used for a lamp reflector to be described below, the thickness thereof is particularly preferably from 10 to 150 µm. When rigidity, light-weightness of the reflector and the like are needed, a polymer base either in a sheet shape or a plate shape is used. The thickness thereof may exceed 250 µm and those having a thickness of, for example, a commercial glass plate and the like can also be used.

Furthermore, in the present invention, a surface in a side opposite to the reflective layer of the reflector may have a shape of mountains and valleys. In that case, the height of a tip of the mountain from a bottom of the valley is not less than 0.1 µm, preferably not less than 0.3 µm, and more preferably from 0.5 to 30 µm. By forming such a shape of mountains and valleys, in addition to improvement of operationality, the adhesive strength can be enhanced in some cases.

As a method for forming a shape of mountains and valleys, there can be exemplified, for example, a method comprising subjecting a surface of the polymer base to embossing processing thereby forming a mountain-and-valley structure thereon, a sandblast method comprising forcibly spraying particles of $SiO_2$ or the like on a surface of the polymer base together with a high pressure air, a chemical method such as etching or the like, a method for coating with particles and the like. On this occasion, a proper method is selected therefrom in accordance with required shapes.

(Surface of a Polymer Base)

In the present invention, elements constituting a surface in a side of the reflective layer of the polymer base are defined as a result of measurement by an X-ray photoelectron spectroscopy (XPS). More specifically, it is impossible to detect hydrogen and helium by XPS so that elements except for hydrogen and helium are defined. Furthermore, in order to rule out the possibility of influence according to the composition of the reflective layer if at all possible, it is preferable to exclude metal elements as well. Metal elements in the present invention refer to generally called metals. In the periodic table, of IA group to VIB group elements, in addition to the aforementioned hydrogen, B (boron), C (carbon), Si (silicon), N (nitrogen), P (phosphorus), As (arsenic), O (oxygen), S (sulfur), Se (selenium), and Te (tellurium) are excluded.

The present invention is characterized by using the polymer base (D1) satisfying the following condition in the method for producing the reflector.

(II) the content ($Rn_1$) of atoms of the same elements as elements (A21) (excluding metals) in elements (A11) (excluding metals) relative to the elements (A11) is not less than 98.0 atomic %, wherein the elements (A11) are observed by the XPS measurement of the surface forming a reflective layer of the polymer base (D1) and the elements (A21) are observed by the XPS measurement of portion at depths of 50 nm to 10 µm from a side of the reflective layer of the appropriate surface of the polymer base (D1).

Here, when the elements (A21) comprise two or more kinds of elements, for example, C (carbon) and O (oxygen), the $Rn_1$ value is represented by the sum of the contents of atoms of such elements included in the elements (A11), i.e., the sum of the contents of carbon and oxygen atoms, while there is no need to compare respective elements in the elements (A11) and the elements (A21). For example, when the elements (A21) comprise carbon and oxygen, even if the contents of carbon atoms in the elements (A11) and the elements (A21) are different, and the contents of oxygen atoms are different, the $Rn_1$ value may satisfy the above requirement.

Here, the elements (A21) (excluding metals) to be observed by the XPS measurement of portions at depths of 50 µm to 10 µm from a side of the reflective layer of the appropriate surface of the polymer base (D1) are considered corresponding to major elements which form the polymer base (D1). For example, polyethylene terephthalate (PET) indicates carbon and oxygen. Although PET contains hydrogen as well, hydrogen as described before cannot be detected by XPS. So, in the present invention, when the polymer base is made of a PET film, the elements (A21) indicate carbon and oxygen, excluding hydrogen. Furthermore, when a very high sensitive XPS is used, an element derived from an additive such as the stabilizer as described above is possibly observed as well, whereas in a generally used XPS device, an element derived from an additive or the like is observed in rare cases. In the present invention, the elements (A21) are considered belonging to major elements which form the polymer base (D1).

Since the XPS measurement makes it possible for measurement in a depth direction by using etching together, such a method is considered to be used for the measurement of the elements (21) as well. However, in case of an organic polymer to be preferably used as the polymer base (D1), a polymer structure might be possibly damaged during etching. Accordingly, in order to measure portions at depths of 50 nm to 10 µm from a surface in a side of the reflective layer of the polymer base (D1) by XPS, the appropriate polymer base surface is cut at a thickness of 50 nm to 10 µm by a diamond cutter or the like. By measuring the thus-cut surface by XPS, the elements (A21) at the aforementioned depth are preferably determined. At this time, the composition of the elements (A21) is determined by an average value of 3 arbitrary points measured at the aforementioned surface. The depth from a surface in a side of the reflective layer is determined in consideration of the quality of the polymer base material or thickness, or a thickness of an outermost layer thereof when the polymer base has a multi-layered structure. Incidentally, the lower limit of the aforementioned depth is more preferably 100 nm and further preferably 200 nm.

In the present invention, the XPS measurement for determining $Rn_1$ and $Rn$ to be described later, usually using an ESCALABiXL220 device manufactured by VG Scientific, is carried out under the conditions that an X-ray source is MgKa (twin anode), an analysis region is in the range of a diameter of 150 μm, a pass energy is 100 eV, a step width is 1.0 eV, and a scan range is from 0 to 1100 eV. It is natural that the above measurement conditions can also be properly changed according to a material in use.

In the present invention, $Rn_1$ of the polymer base (D1) of not less than 98.0 atomic %, in other words, means that the surface of the polymer base (D1) and internal constituent elements are practically almost the same and $Rn_1$ is understood as an indicator specifying its degree.

In the present invention, the reason why the above specification is important can be assumed as follows. That is, it is expected that a polymer base which does not satisfy the above application has wastes or foreign substances from the outside, and a stabilizer bleeding out from the inside of the polymer base existed on a surface in a side of the reflective layer, and these substances cause the deterioration of the reflectance. The above assumption is supported from the review of the present inventors that, needless to say, as the polymer base (D1) which is preferably used for the production of the reflector according to the present invention, a reflector with a surface satisfying the above condition is produced and used accordingly. In addition, by subjecting even a polymer base out of the above condition to a pre-treatment, a polymer base satisfying the above condition (II) is obtained. That is, foreign substances or the like would be removed from the polymer base surface by the pre-treatment so that a polymer base satisfying the condition as the polymer base (D1) would be obtained. As a method for subjecting the above polymer base to the pre-treatment, in addition to a method comprising coming into contact with a liquid, a plasma treatment, a combination of these methods or the like can be cited. In particular, a polymer base (D2) obtained in a method comprising coming into contact with a liquid is preferably used. In addition, a polymer base preferably comes into contact with a liquid after performing an annealing process for promoting bleeding-out of a stabilizer. When a polymer base comes into contact with a liquid, as a liquid, in addition to water, alcohol types such as ethanol and the like, ketones such as acetone and the like are preferably used. The liquid in use is not restricted thereto as far as a polymer base satisfying the above condition (II) is obtained. Further, those with the surface shape of the polymer base which is not actually changed are more preferable.

As a more concrete reason why the high $Rn_1$ value of the polymer base (D1) is needed for the reflector according to the present invention, the following assumption can be introduced.

In the reflector of the present invention, in order to achieve a high reflection-increasing effect, the thickness of the low refractive index layer (B) and the high refractive index layer (A) needs to be relatively thick as described above. So, when these layers are formed by the vacuum film-forming method, the time required for forming a film needs to be relatively long. During forming a film, the polymer base (D1) is exposed to a relatively high temperature. Therefore, the polymer base which does not satisfy the above requirement (II), i.e., with low $Rn_1$ value contains relatively lots of foreign substances or a stabilizer that is bled out on its surface. The metal layer (C), the low refractive index layer (B) and the high refractive index layer (A) are easily changed in its quality due to such foreign substances or a stabilizer, thereby deteriorating enhancement of the reflectance.

As reviewed by the present inventors, it is known that when a polymer base which does not satisfy the condition (II) is used, even though an underlying layer such as an indium tin oxide (ITO) layer or the like is placed on the surface of the polymer base, a reflector with high reflectance is not obtained as much as the object of the present invention in some cases. It is considered that the above assumption is supported by this result.

When $Rn_1$ of the polymer base (D1) according to the present invention is not less than 98.0 atomic %, a reflector having a very high reflectance is obtained. $Rn_1$ is more preferably not less than 98.5 atomic %, and further preferably not less than 99.0 atomic %. For example, when a PET film is used as a polymer base, and the total content of carbon and oxygen atoms is not less than 98.0 atomic % of the total elements detected by the XPS measurement of its surface, it can be used for the production of the reflector of the present invention.

In the present invention, a surface refers to a region to a depth usually measured by XPS, and the depth from the surface is specifically in the range of 1 to 10 nm and preferably in the range of 1 to 8 nm.

(Reflector)

A reflective layer of the reflector in the present invention comprises at least a high refractive index layer (A), a low refractive index layer (B) and a metal layer (C) mainly composed of a metal selected from silver or aluminum. The reflective layer is made of not less than 3 layers and not more than 31 layers, preferably not less than 3 layers and not more than 21 layers, and further preferably not less than 3 layers and not more than 11 layers. The metal layer may be basically made of 1 layer and may be made of 2 or more layers. When the number of laminated layers of the high refractive index layer and the low refractive index layer is increased, the reflectance tends to be higher but there are problems in the productivity and the cost in some cases and there is a problem in that the reflectance is lowered due to absorption of at least a little bit of light by the high refractive index layer or the low refractive index layer in some cases.

A positional relationship of each layer in the above multi-layered structure may be at least one or more combinations in the order of a high refractive index layer (A)/a low refractive index layer (B)/a metal layer (C) mainly composed of silver or aluminum. Concrete examples thereof preferably include:

a metal layer(C)/a low refractive index layer (B)/a high refractive index layer (A);

a metal layer(C)/a low refractive index layer (B)/a high refractive index layer (A)/a low refractive index layer (B)/a high refractive index layer (A);

a metal layer(C)/a low refractive index layer (B)/a high refractive index layer (A)/a low refractive index layer (B)/a high refractive index layer (A)/a low refractive index layer (B)/a high refractive index layer (A); or a metal layer(C)/a low refractive index layer (B)/a high refractive index layer (A)/a low refractive index layer (B)/a high refractive index layer (A)/a low refractive index layer (B)/a high refractive index layer (A)/a low refractive index layer (B)/a high refractive index layer (A).

The polymer base (D) can be positioned at an arbitrary position in a multi-layered structure of the above reflective layer, but it preferably has a structure in which the above reflective layer is formed on one surface of the polymer base. That is, examples thereof include such a structure preferably having a laminate structure in the order of (A)/(B)/(C)/(D) such as:

a polymer base (D)/a metal layer(C)/a low refractive index layer (B)/a high refractive index layer (A);

a polymer base (D)/a metal layer(C)/a low refractive index layer (B)/a high refractive index layer (A)/a low refractive index layer (B)/a high refractive index layer (A);

a polymer base (D)/a metal layer(C)/a low refractive index layer (B)/a high refractive index layer (A)/a low refractive index layer (B)/a high refractive index layer (A)/a low refractive index layer (B)/a high refractive index layer (A); or a polymer base (D)/a metal layer(C)/a low refractive index layer (B)/a high refractive index layer (A)/a low refractive index layer (B)/a high refractive index layer (A)/a low refractive index layer (B)/a high refractive index layer (A)/a low refractive index layer (B)/a high refractive index layer (A). In those cases, the above reflector is used for reflecting an incident light from a side of the outermost high refractive index layer (A).

Furthermore, the following structures can be preferably cited:

a metal layer(C)/a low refractive index layer (B)/a high refractive index layer (A)/a polymer base (D);

a metal layer(C)/a low refractive index layer (B)/a high refractive index layer (A)/a low refractive index layer (B)/a high refractive index layer (A)/a polymer base (D);

a metal layer(C)/a low refractive index layer (B)/a high refractive index layer (A)/a low refractive index layer (B)/a high refractive index layer (A)/a low refractive index layer (B)/a high refractive index layer (A)/a polymer base (D);

a metal layer(C)/a low refractive index layer (B)/a high refractive index layer (A)/a low refractive index layer (B)/a high refractive index layer (A)/a low refractive index layer (B)/a high refractive index layer (A)/a low refractive index layer (B)/a high refractive index layer (A)/a polymer base (D) or the like.

In those cases, the above reflector is used for reflecting an incident light from a side of the polymer base. Accordingly, in the above case, the transmittance of the polymer base (D) is preferably high. The total light transmittance of the polymer base is preferably not less than 70%, more preferably not less than 75%, and further preferably not less than 80%. Furthermore, a haze value of the polymer base in this case is different depending on the applications of the reflector and cannot be uniformly defined, but in the reflector of the present invention, it is preferably low in many cases. The haze value is preferably not more than 20%, more preferably not more than 10%, further preferably not more than 8%, and particularly preferably not more than 6%.

Furthermore, in the ranges in which the object of the present invention is not damaged, other layers may be formed. Concrete examples of these layers include a layer for enhancing interface adhesiveness such as a metal layer of chrome, titanium, tungsten and the like or a metal oxide layer of zinc oxide, aluminum oxide and the like, a hard coat layer for enhancing anti-scratching property and the like.

Figure 2:
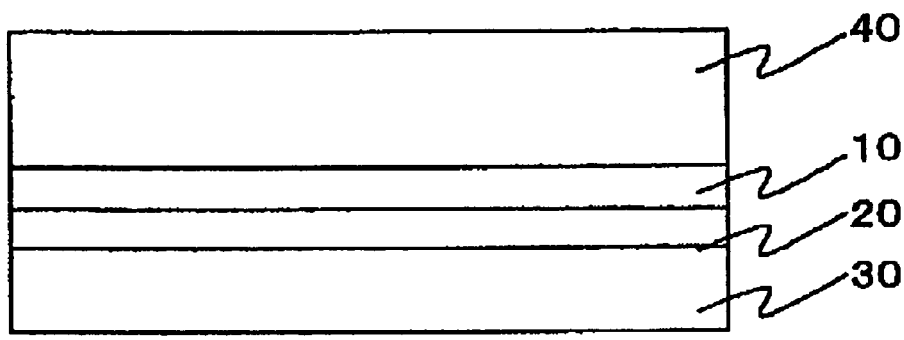
FIG. 2 is a cross-sectional view illustrating the other embodiment (2) of a reflector according to the present invention.

Embodiments of the reflector in the present invention are illustrated in FIGS. 1 and 2. The reflector in FIG. 1 comprises a metal layer 30 mainly composed of silver or aluminum, a low refractive index layer 20, and a high refractive index layer 10 laminated on a polymer film 40. In this case, a side of the reflective layer becomes a reflective surface. Furthermore, the reflector in FIG. 2 comprises the polymer film 40 on the high refractive index layer 10. A reflective surface in this case becomes a side of the polymer film.

Figure 3:
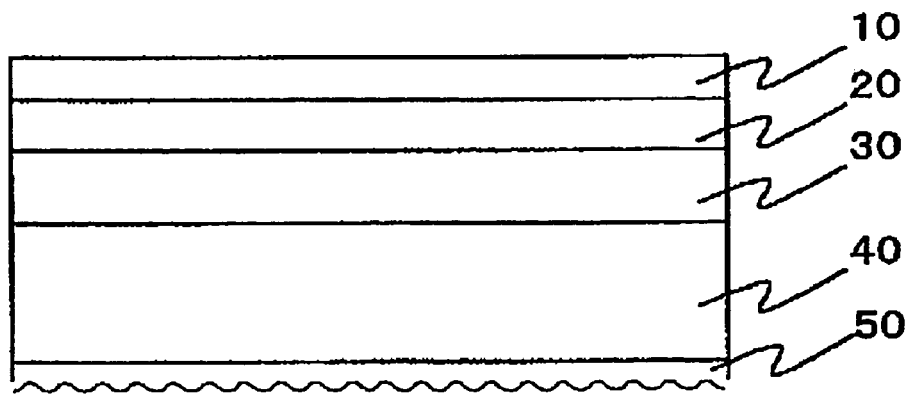
FIG. 3 is a cross-sectional view illustrating the other embodiment (3) of a reflector according to the present invention.

Furthermore, as described above, an embodiment of the reflector having a shape of mountains and valleys on the polymer film is shown in FIG. 3. The reflector in FIG. 3 comprises the metal layer 30 mainly composed of silver or aluminum, the low refractive index layer 20, and the high refractive index layer 10 laminated on the polymer film 40 having a sliding layer 50.

The polymer base (D) constituting the reflector of the present invention satisfies the following condition (I), (I) the content (Rn) of atoms of the same elements as elements (A2) (excluding metals) in elements (A1) (excluding metals) relative to the elements (A1) is not less than 98.0 atomic %, wherein the elements (A1) are observed by the XPS measurement of portion at depths of 0 nm to 10 nm from a side of the reflective layer of the polymer base (D) and the elements (A2) are observed by the XPS measurement of portion at depths of 50 nm to 10 μm from a side of the reflective layer of the polymer base (D).

The reason why the above condition (I) is important is the same as that why the condition (II) is important as described above. Furthermore, the above Rn value and the aforementioned $Rn_1$ value are essentially not much different from each other. Accordingly, the aforementioned reflector to be produced by using the polymer base (D1) satisfying the condition (II) may be considered to be satisfying the above condition (I) as well.

In order to specify portions at depths of 0 to 10 nm from a side of the reflective layer of the polymer base (D) or the thickness of the high refractive index layer (A), the low refractive index layer (B) and the metal layer (C), it is necessary to define each interface. The definition of these layers is explained when the polymer base (D) and the metal layer (C) forms this interface. In the present invention, when the content of carbon atoms of the polymer base (D) is defined as β atomic %, and the content of atoms of the metal element of a substance forming the metal layer (C) is defined as α atomic %, a surface where the value of $(\alpha/(\alpha+\beta))$ becomes 0.5 is taken for an interface. The contents of the above atoms can be determined by a known analysis method such as the aforementioned XPS or the like.

Other interfaces can be determined in the same manner. Namely, an interface can be determined by the contents of atoms of elements such as a metal or the like determining each layer being defined respectively as α and β. For example, an interface between a silver layer (an example of the metal layer (C)) and a silicon oxide layer (an example of the low refractive index layer (B)) can be determined by measuring the contents of silver and silicon atoms. An interface, between the silicon oxide layer and a titanium oxide layer (an example of the high refractive index layer (A)) can be determined by measuring the contents of silicon and titanium atoms.

Furthermore, measurement of the aforementioned elements (A1) can be determined by the XPS measurement while etching the layer (A), the layer (B), and the layer (C). On the other hand, the elements (A2) are measured in the same manner as described above. A surface of the reflector is cut at a thickness of from 50 nm to 10 μm from an interface with the reflective layer and, then, the thus-cut surface is measured. Such a method is preferably adopted. The reason is also to avoid an effect of damage due to etching of the polymer base (D). The elements (A1) value and the elements (A2) value are determined by their respective averages of three arbitrary points measured on their respective appropriate surface portions.

(Reflectance of a Reflector)

In the reflector produced in the method as described above, the total light reflectance to be measured from a side of the reflective surface is typically not less than 97%, more preferably not less than 98%, and further preferably not less than 98.5% to light at a wavelength of 550 nm when a metal layer mainly composed of silver is used. Furthermore, when a metal layer mainly composed of aluminum is used, the total light reflectance is not less than 91%, more preferably not less than 92%, and further preferably not less than 93% to light at a wavelength of 550 nm.

In a general reflector, in order to prevent the deterioration of a metal layer, a protective layer comprising a transparent metal oxide or the like is required to be laminated on a metal layer. However, in the reflector of the present invention, the low refractive index layer and the high refractive index layer which also play a role of a protective layer in some cases are laminated on the metal layer mainly composed of silver. For this reason, a protective layer can be omitted in some cases.

(Application to a Lamp Reflector)

The aforementioned reflector can be used for the reflector of the present invention as it is, whereas a film shape or a sheet shape (hereinafter referred to as a reflective sheet) in the reflector may be fixed to a supporting body of a molded body in a plate shape or a sheet shape. As a method for fixing the reflective sheet, a joint by an adhesive or a tackifier, a method for conducting thermal fusion bonding or attaching after selectively dissolving the film surface using a solvent when it is fixed via the polymer base (D) and the like can be cited. The method using an adhesive or a tackifier is preferably used.

Figure 4:
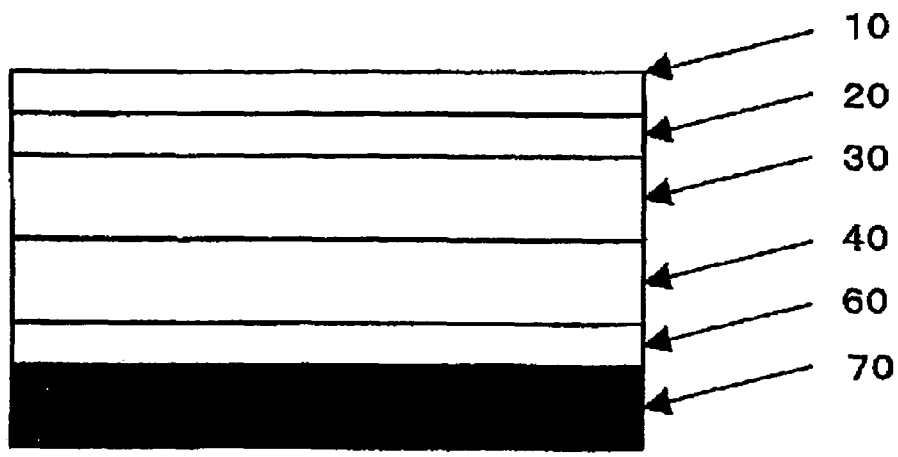
FIG. 4 is a cross-sectional view illustrating one embodiment (1) of a reflector according to the present invention.
Figure 5:
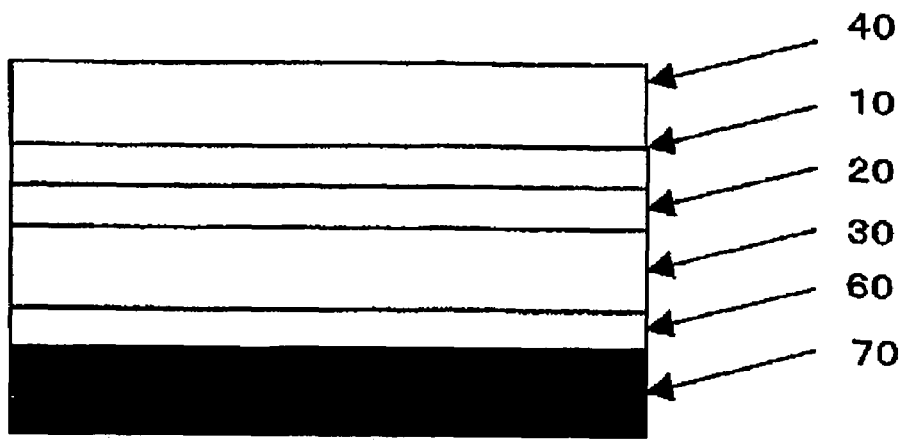
FIG. 5 is a cross-sectional view illustrating another embodiment (2) of a reflector according to the present invention.

Embodiments of the reflector according to the present invention are illustrated in FIGS. 4 and 5. The reflector in FIG. 4 comprises a reflective sheet with the metal layer 30 mainly composed of silver or aluminum, the low refractive index layer 20, the high refractive index layer 10 laminated on the polymer film 40, attached to a supporting body 70 by means of an adhesive material layer 60. Furthermore, in the reflector in FIG. 5, the polymer film 40 is at a side of a reflective surface, and the metal layer 30 mainly composed of a metal selected from silver or aluminum and the supporting body 70 are attached to each other by means of the adhesive material layer 60. In this case, a metal or a metal oxide other than those described above is deposited between the metal layer mainly composed of a metal selected from silver or aluminum and the adhesive material layer for enhancing adhesion in some cases.

Known materials can be used for the above adhesive, tackifier, and supporting body. More concrete examples thereof are disclosed, for example, in JP2002-117725A and the like.

Figure 6:
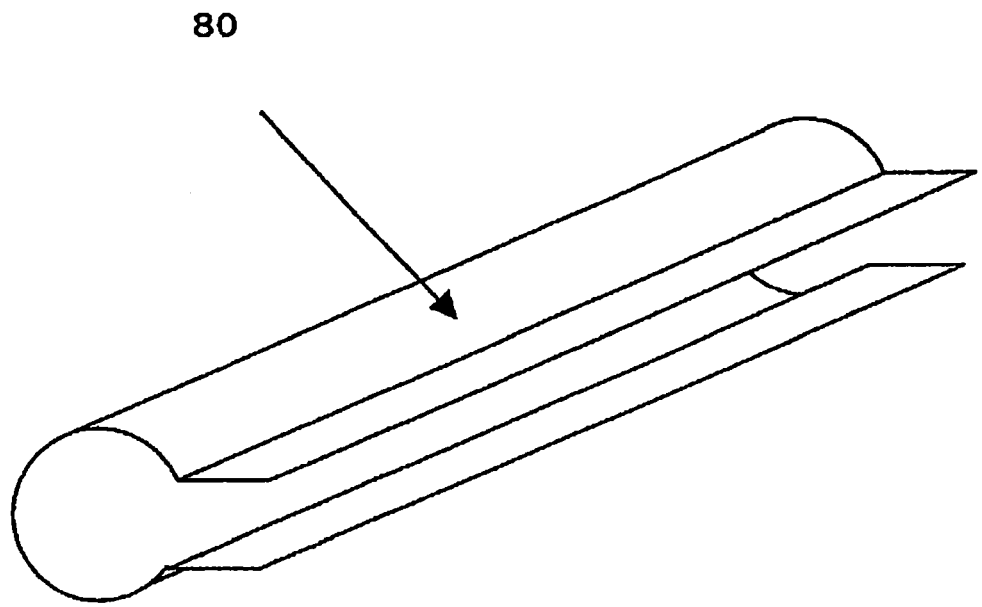
FIG. 6 is an embodiment of a lamp reflector obtained by molding the reflector according to the present invention.

Since the reflector according to the present invention is excellent in the reflectance, durability and moldability, the reflector can be suitably used for a lamp reflector for a sidelight type backlight for use in a liquid crystal display, and can provide a beautiful image with a high luminance. It is preferable that the lamp reflector according to the invention is manufactured by the steps of subjecting a reflector comprising the aforementioned reflector and a supporting body attached thereto as needed to punching processing in a predetermined shape and subjecting the thus-punching processed reflector to bending processing, for example, in a shape as shown in FIG. 6 such that a cold cathode ray tube is wrapped. Such a lamp reflector 80 can be preferably cited. Furthermore, when the aforementioned punching processing is performed, the reflector may be made into cut-sheets having a favorable size in advance. When it becomes necessary to transport the thus-made cut-sheets from the reason that cut-sheet processing, punching processing and bending processing are performed by other devices and the like, it is preferable that several tens of cut-sheets are stacked, vacuum packed and, then, transported. On this occasion, it is preferable that a packaging material to be used has a smooth surface from the reason that, when the packaging material having an irregular surface such as an air cap is used, a minute deformation will be generated on a surface of the cut-sheet to deteriorate performance of the lamp reflector in some cases.

Figure 7:
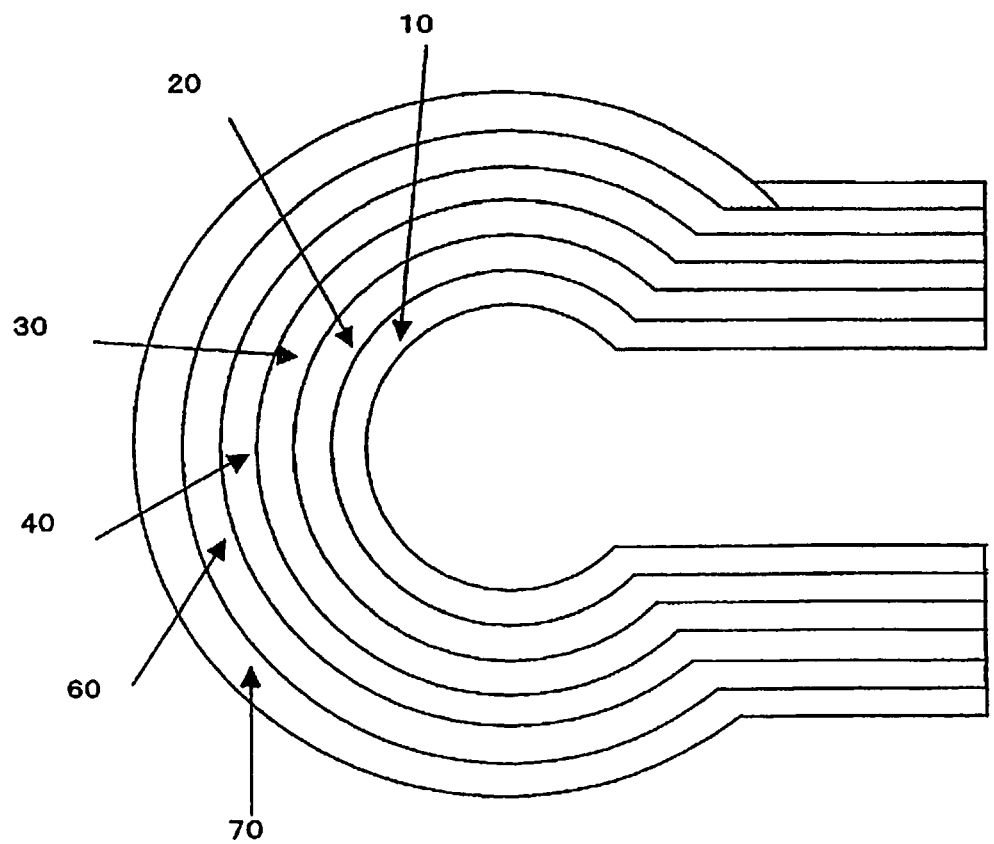
FIG. 7 is one embodiment (1) of a cross-sectional configuration of a lamp reflector according to the present invention.
Figure 8:
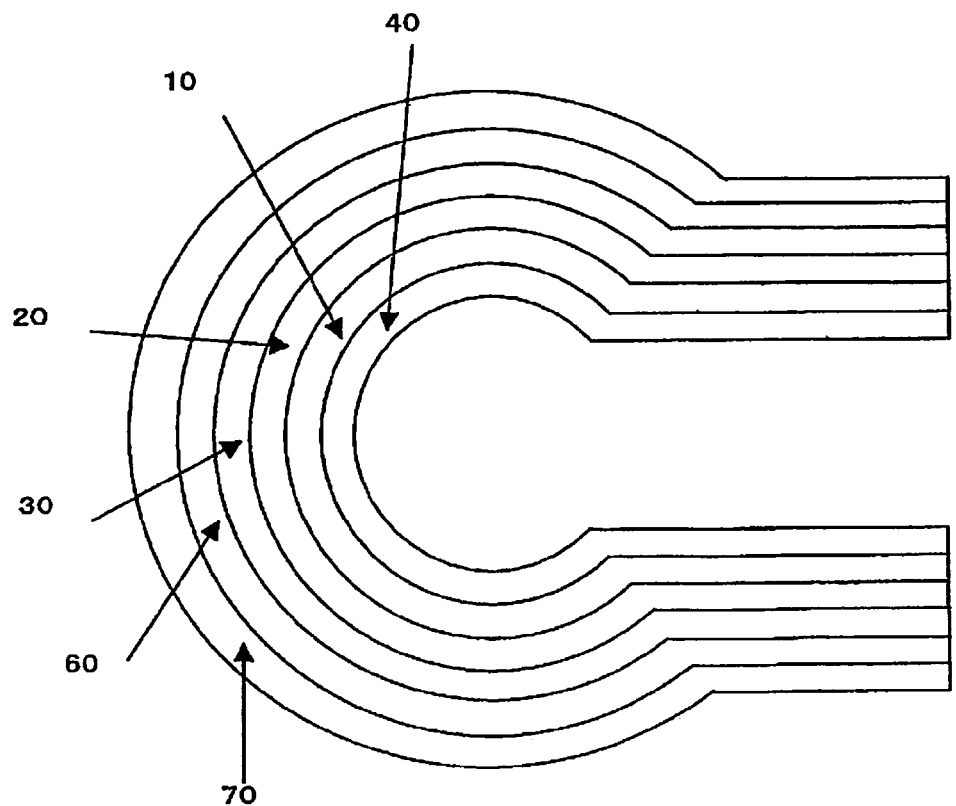
FIG. 8 is another embodiment (2) of a cross-sectional configuration of a lamp reflector according to the present invention.

At the time of carrying out the aforementioned bending processing, for example, as shown in the cross-sectional view of FIG. 7, a reflective layer comprising the layer 30 mainly composed of silver or aluminum, the low refractive index layer 20 and the high refractive index layer 10 is located in an innermost side, while a supporting body is arranged in an outermost side. Furthermore, as shown in FIG. 8, the polymer film 40 on the high refractive index layer 10 is located in an innermost side. Further, other processes such as drilling processing or the like may be added as required.

The shape after bending processing is different depending on the way of applications, but a shape of letter U, a shape of letter ], a shape of letter V and the like are preferable. On this occasion, a curvature radius at the time of bending processing is preferably not more than 5 mm and more preferably not more than 4 mm.

As concrete processing methods, V letter bending, U letter bending by using a press, folding bending by using a tangent bender or the like can be mentioned.

When the aforementioned polymer bases (D, D1, and D2) are a polymer sheet or a polymer film, the reflector of the present invention is particularly excellent in moldability, and a wrinkle or an emboss is not generated thereon even when such processing as described above is performed. In this manner, the lamp reflector to be obtained from the reflector of the present invention can realize a beautiful image which has a high luminance and does not generate a luminescent line when the lamp reflector is assembled into a sidelight type backlight device.

Examples of light sources to be used include an incandescent lamp, a light emitting diode (LED), an electroluminescence (EL), a fluorescent lamp, a metal halide lamp and the like. Of these, the fluorescent lamp is preferably used. The fluorescent lamps are broadly classified into two categories in accordance with electrode structure or methods of turning on the light, that is, a hot cathode type and a cold cathode type; on this occasion, there is a tendency in which the hot cathode type allows both an electrode and an inverter to be larger in size than the cold cathode type. The hot cathode type is efficient such that a loss of illumination in the vicinity of the electrode which does not contribute to luminescence is small and is high in an intensity of luminescence such that a luminescence efficiency is several times more excellent than that with the cold cathode type; however, since the cold cathode type is superior to the hot cathode type in duration of service life, the cold cathode type is more preferably used from the standpoints of low power consumption, durability and the like as compared with the hot cathode type.

As a conductor for supplying electric current to the fluorescent lamp, an ordinary coated lead wire is used; on this occasion, when sulfur is contained in a coating material, since a sulfide such as hydrogen sulfide or the like is generated due to deterioration thereof with time whereupon there is a possibility that the reflective layer or other members may be deteriorated, it is preferable that the conductor using the coating material free of sulfur is preferably used.

In the lamp reflector according to the present invention, when the reflective layer in a thin film shape as shown in FIG. 7 is located in an outermost layer in a side of the light source, light is not confined within a resin as is seen in a type of the reflector protected by a transparent resin and the like. For this reason, even when an intensity of luminance is enhanced, the luminescent line or the like is not generated thereon so that a beautiful image having a high luminance can be realized.

Further, since the lamp reflector of the present invention has a high reflectance, there are also effects that an internal temperature is lowered and durability is enhanced.

Figure 9:
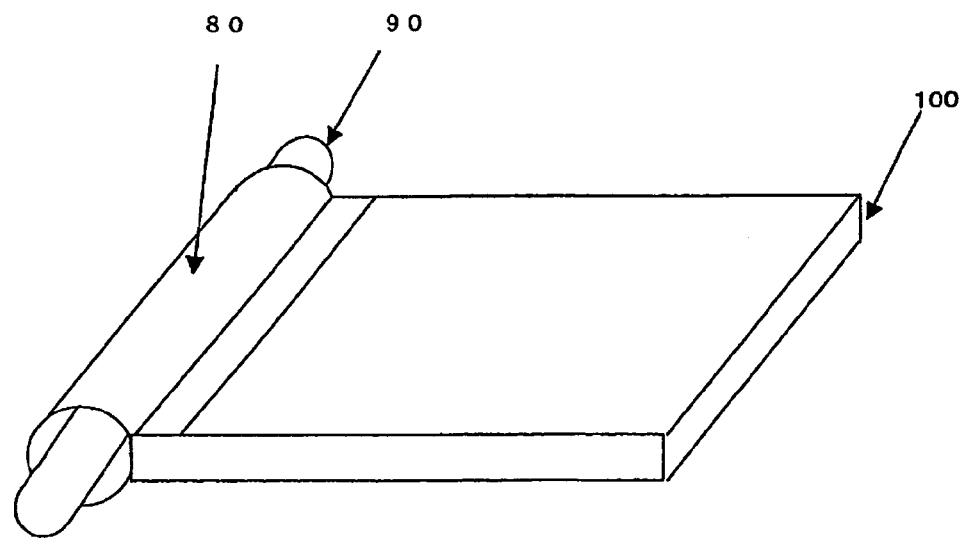
FIG. 9 is an embodiment of a lamp reflector according to the present invention attached to a sidelight type backlight unit.

The reflector or the lamp reflector according to the present invention can be used for a sidelight type backlight device. An embodiment of the sidelight type backlight device of the present invention is illustrated in FIG. 9. That is, a lamp reflector 80 is arranged such that a light source 90 placed near a light-guiding plate 100 is wrapped.

(Application to a Reflector Under a Light-Guiding Plate)

The reflector of the present invention has a very high reflectance so that it can also be used as a reflector under a light-guiding plate. When it is used as a reflector under a light-guiding plate, the reflector preferably has a diffuse reflection function. Specifically, the reflection haze value calculated by 100×(diffusion reflectance)/(total reflectance)

is preferably not more than 70%, more preferably not more than 50%, further preferably not more than 20%, and particularly preferably not more than 10%. As a method for controlling the above-mentioned diffusion haze, known methods such as a method for forming a mountain and valley on a polymer base, a method for placing a transparent mountain-and-valley layer on a planar reflector can be adopted without restrictions. As a preferred method for forming a mountain and valley on the polymer base, a method comprising mixing a resin and a resin bead together, and then molding the mixture into a plate shape, a sheet shape, or a film shape using an extruder, or a method for forming a mountain-and-valley layer by coating a planar polymer base with a mixture of a resin bead and a binder resin can be cited. As the binder resin, the same kinds of resins used for a polymer film are preferably used.

As a method for forming a mountain-and-valley layer, the aforementioned embossing molding method, a sandblast method, an etching method or the like can be adopted in addition.

Figure 10:
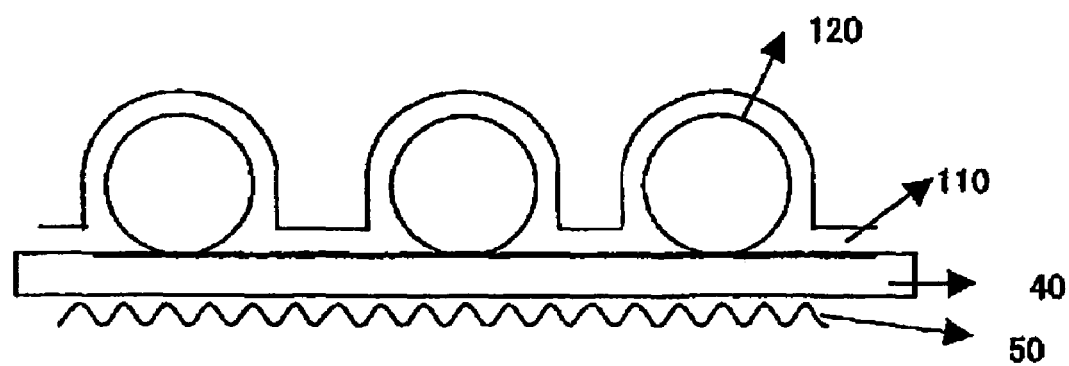
FIG. 10 is an embodiment of a cross-sectional view of a reflector under a light-guiding plate according to the present invention.

An embodiment of the reflector under a light-guiding plate according to the present invention is illustrated in FIG. 10. That is, a mountain-and-valley layer 120 comprising a resin bead and a binder resin is formed on the polymer film 40 with the sliding layer 50 attached thereto, on which a reflective layer 110 comprising the metal layer, the low refractive index layer and the high refractive index layer laminated therewith in sequence is formed.

(Evaluation Method in the Present Invention)

Representative evaluation methods of the reflectance, configuration and the like of the present invention, i.e., the reflector, will be explained below. The reflectance of the reflector of the present invention can be measured from a side of the reflective layer by placing an integrating sphere of 150ϕ at Hitachi self-recording spectrophotometer (type U-3400). The reflectance mentioned herein converts the reflectance of an aluminum white plate into 100%. The thickness of each of the metal layer (C) mainly composed of a metal selected from silver or aluminum, the high refractive index layer (A), the low refractive index layer (B), an adhesive layer, and a molded body in a plate shape can be directly measured by observing each of cross-sectional surfaces thereof by using a transmission electron microscope (TEM). The refractive index of a material of the metal layer(C), the high refractive index layer (A), and the low refractive index layer (B) can be measured by an ellipsometer. The concentration of an element of the polymer base (D) surface can be analyzed by an X-ray photoelectron spectroscopy (XPS). An analysis of the material of the polymer base can be performed by using an infrared spectroscopy (IR). Furthermore, to analyze the material of the adhesive, a metal thin film layer and a molded body in a plate shape are peeled away to allow an adhesive to be exposed, the thus-exposed adhesive is dissolved in a proper solvent to prepare a sample and, then, the thus-prepared sample is subjected to measurement by the infrared spectroscopy (IR). The material of the metal thin film layer and the molded body in a plate shape can be analyzed by an X-ray fluorescence spectroscopy (XRF) measurement. Furthermore, an electron probe X-ray microanalyzer (EPMA) can carry out an elemental analysis in a finer portion than the X-ray fluorescence spectroscopy. Further, the thickness can be known by performing a composition analysis and obtaining a depth profile by using an Auger electron spectroscopy (AES) and a secondary ion mass spectroscopy (SIMS).

EXAMPLES

The present invention is now more specifically illustrated below with reference to Examples.

Incidentally, the reflectance was measured from a side of the reflective layer by placing an integrating sphere of 150 ϕ at Hitachi self-recording spectrophotometer (Type U-3400).

Furthermore, for the XPS measurement, an ESCAL-ABiXL220 device manufactured by VG Scientific was used.

Example 1

A commercial PET sheet (thickness: 125 μm) was washed with acetone. Its main surface was measured by XPS. As a result, only carbon and oxygen were detected. Furthermore, although a surface after its surface was cut in a size of 5 μm was measured by XPS, only carbon and oxygen were detected. Namely, the $Rn_1$ value of the thus-obtained PET sheet was 100%. A silver film was formed on the main surface of the PET sheet by a DC magnetron sputtering method, using silver (purity: 99.99%) as a target and using argon with a purity of 99.5% as a sputtering gas, such that the thickness thereof became 150 nm. Subsequently, without taking the thus-prepared sheet out of a sputtering apparatus, an $SiO_2$ film was formed on the sheet by an RF magnetron sputtering method, using $SiO_2$ with a purity of 99.9% as a target and using argon with a purity of 99.5% as a sputtering gas, such that the thickness thereof became 48 nm. Subsequently, without taking the latter resultant sheet out of the sputtering apparatus, a $TiO_2$ film was formed, using $TiO_2$ (purity: 99.9%) as a target, and using argon with a purity of 99.5% and oxygen as a sputtering gas, such that the thickness thereof became 55 nm. At this time, the concentration of oxygen was regulated to be 3%. The total light reflectance of the thus-obtained reflective sheet in a side of the reflective layer was measured at a wavelength of 550 nm. As a result, the reflectance was 98.7%.

Example 2

An Al film was formed on the PET sheet used in Example 1 by the DC magnetron sputtering method, using Al (purity: 99.99%) as a target and using argon with a purity of 99.5% as a sputtering gas, such that the thickness thereof became 150 nm. Subsequently, without taking the thus-prepared sheet out of a sputtering apparatus, an $SiO_2$ film was formed on the sheet by the RF magnetron sputtering method, using $SiO_2$ with a purity of 99.9% as a target and using argon with a purity of 99.5% as a sputtering gas, such that the thickness thereof became 48 nm. Subsequently, without taking the latter resultant sheet out of the sputtering apparatus, a $TiO_2$ film was formed on the sheet, using $TiO_2$ (purity: 99.9%) as a target, and using argon with a purity of 99.5% and oxygen as a sputtering gas, such that the thickness thereof became 55 nm. At this time, the concentration of oxygen was regulated to be 3%. The total light reflectance of the thus-obtained reflective sheet in a side of the reflective layer was measured at a wavelength of 550 nm. As a result, the reflectarice was 93.6%.

Comparative Example 1

A reflective sheet was obtained in accordance with Example 1, except that a commercial PET sheet having the $Rn_1$ value measured in the same manner as in Example 1 of 97.8 atomic % (in addition to carbon and oxygen, a plurality of elements such as nitrogen, sulfur and the like were detected) was used as it was. The total light reflectance of the thus-obtained reflective sheet in a side of the reflective layer measured at a wavelength of 550 nm was 96.4%.

Comparative Example 2

A reflective sheet was obtained in accordance with Example 2, except that the same PET sheet as in Comparative Example 1 was used. The total light reflectance of the thus-obtained reflective sheet in a side of the reflective layer measured at a wavelength of 550 nm was 88.5%.

Comparative Example 3

An Ag film was formed on the same PET sheet as in Example 1 by the DC magnetron sputtering method, using Ag (purity: 99.99%) as a target and using argon with a purity of 99.5% as a sputtering gas, such that the thickness thereof became 150 nm. The total light reflectance of the thus-obtained reflective sheet in a side of the reflective layer was measured at a wavelength of 550 nm. As a-result, the reflectance was 96.5%.

Comparative Example 4

An Ag film was formed on the same PET sheet as in Comparative Example 1 by the DC magnetron sputtering method, using Ag (purity: 99.99%) as a target and using argon with a purity of 99.5% as a sputtering gas, such that the thickness thereof became 150 nm. The total light reflectance of the thus-obtained reflective sheet in a side of the reflective layer was measured at a wavelength of 550 nm. As a result, the reflectance was 96.6%.

Comparative Example 5

An Al film was formed on the same PET sheet as in Example 1 by the DC magnetron sputtering method, using Al (purity: 99.99%) as a target and using argon with a purity of 99.5% as a sputtering gas, such that the thickness thereof became 150 nm. The total light reflectance of the thus-obtained reflective sheet in a side of the reflective layer was measured at a wavelength of 550 nm. As a result, the reflectance was 88.7%.

Comparative Example 6

An Al film was formed on the same PET sheet as in Comparative Example 1 by the DC magnetron sputtering method, using Al (purity: 99.99%) as a target and using argon with a purity of 99.5% as a sputtering gas, such that the thickness thereof became 150 nm. The total light reflectance of the thus-obtained reflective sheet in a side of the reflective layer was measured at a wavelength of 550 nm. As a result, the reflectance was 88.5%.

The above results are shown in Table 1.

Comparative Example 7

A reflective sheet was obtained in the same manner as in Comparative Example 1, except that before a silver thin film layer was formed, an AZO film was formed on the PET by the DC magnetron sputtering method, using AZO (ZnO:$Al_2O_3$=98wt %:2 wt %) as a target and using argon with a purity of 99.5% as a sputtering gas, such that the thickness thereof became 20 nm.

The total light reflectance of the thus-obtained reflective sheet in a side of the reflective layer was measured at a wavelength of 550 nm. As a result, the reflectance was 96.8%.

TABLE 1

| | $Rn_1$ (atomic %) | Reflective Layer | Total Light Reflectance (at 550 nm) |
|---|---|---|---|
| Example 1 | 100 | Ag reflection-increasing film | 98.7 |
| Comparative Example 1 | 97.8 | Ag reflection-increasing film | 96.4 |
| Comparative Example 3 | 100 | Ag single-layered film | 96.5 |
| Comparative Example 4 | 97.8 | Ag single-layered film | 96.6 |
| Example 2 | 100 | Al reflection-increasing film | 93.6 |
| Comparative Example 2 | 97.8 | Al reflection-increasing film | 88.5 |
| Comparative Example 5 | 100 | Al single-layered film | 88.7 |
| Comparative Example 6 | 97.8 | Al single-layered film | 88.5 |

Comparative Example 8

A reflective sheet was obtained in the same manner as in Comparative Example 1, except that before a silver thin film layer was formed, a $TiO_2$ film was formed on the PET by the RF magnetron sputtering method, using $TiO_2$ with a purity of 99.9% as a target, and using argon with a purity of 99.5% and oxygen as a sputtering gas (oxygen concentration: 3%), such that the thickness thereof became 20 nm.

The total light reflectance of the thus-obtained reflective sheet in a side of the reflective layer was measured at a wavelength of 550 nm. As a result, the reflectance was 96.6%.

Comparative Example 9

A reflective sheet was obtained in the same manner as in Comparative. Example 1, except that before a silver thin film layer was formed, an $Al_2O_3$ film was formed on the PET by the RF magnetron sputtering method, using $Al_2O_3$ with a purity of 99.99% as a target, and using argon with a purity of 99.5% and oxygen as a sputtering gas (oxygen concentration: 3%), such that the thickness thereof became 20 nm.

The total light reflectance of the thus-obtained reflective sheet in a side of the reflective layer was measured at a wavelength of 550 nm. As a result, the reflectance was 96.4%.

Comparative Example 10

A reflective sheet was obtained in the same manner as in Comparative Example 1, except that before a silver thin film layer was formed, an NiCr film was formed on the PET by the DC magnetron sputtering method, using NiCr (Ni:Cr=65 wt %:35 wt %) as a target and using argon with a purity of 99.5% as a sputtering gas, such that the thickness thereof became 20 nm.

The total light reflectance of the thus-obtained reflective sheet in a side of the reflective layer was measured at a wavelength of 550 nm. As a result, the reflectance was 96.6%.

Comparative Example 11

A reflective sheet was obtained in the same manner as in Comparative Example 2, except that before an aluminum thin film layer was formed, an AZO film was formed on the PET by the DC magnetron sputtering method, using AZO (ZnO: $Al_2O_3$=98 wt %:2 wt %) as a target and using argon with a purity of 99.5% as a sputtering gas, such that the thickness thereof became 20 nm.

The total light reflectance of the thus-obtained reflective sheet in a side of the reflective layer was measured at a wavelength of 550 nm. As a result, the reflectance was 88.6%.

Comparative Example 12

A reflective sheet was obtained in the same manner as in Comparative Example 2, except that before an aluminum thin film layer was formed, a $TiO_2$ film was formed on the PET by the RF magnetron sputtering method, using $TiO_2$ with a purity of 99.9% as a target, and using argon with a purity of 99.5% and oxygen as a sputtering gas (oxygen concentration: 3%), such that the thickness thereof became 20 nm.

The total light reflectance of the thus-obtained reflective sheet in a side of the reflective layer was measured at a wavelength of 550 nm. As a result, the reflectance was 88.5%.

Comparative Example 13

A reflective sheet was obtained in the same manner as in Comparative Example 2, except that before an aluminum thin film layer was formed, an $Al_2O_3$ film was formed on the PET by the RF magnetron sputtering method, using $Al_2O_3$ with a purity of 99.99% as a target, and using argon with a purity of 99.5% and oxygen as a sputtering gas (oxygen concentration: 3%), such that the thickness thereof became 20 nm.

The total light reflectance of the thus-obtained reflective sheet in a side of the reflective layer was measured at a wavelength of 550 nm. As a result, the reflectance was 88.5%.

Comparative Example 14

A reflective sheet was obtained in the same manner as in Comparative Example 2, except that before an aluminum thin film layer was formed, an NiCr film was formed on the PET by the DC magnetron sputtering method, using NiCr (Ni: Cr=65 wt %:35 wt %) as a target and using argon with a purity of 99.5% as a sputtering gas, such that the thickness thereof became 20 nm.

The total light reflectance of the thus-obtained reflective sheet in a side of the reflective layer was measured at a wavelength of 550 nm. As a result, the reflectance was 88.4%.

The above results are shown in Table 2.

TABLE 2

| | $Rn_1$ (atomic %) | Underlying Layer | Reflective Layer | Total Light Reflectance (at 550 nm) |
|---|---|---|---|---|
| Example 1 | 100 | — | Ag reflection-increasing film | 98.7 |
| Comparative Example 1 | 97.8 | — | Ag reflection-increasing film | 96.4 |
| Comparative Example 7 | 97.8 | AZO | Ag reflection-increasing film | 96.8 |
| Comparative Example 8 | 97.8 | $TiO_2$ | Ag reflection-increasing film | 96.6 |
| Comparative Example 9 | 97.8 | $Al_2O_3$ | Ag reflection-increasing film | 96.4 |
| Comparative Example 10 | 97.8 | NiCr | Ag reflection-increasing film | 96.6 |
| Example 2 | 100 | — | Al reflection-increasing film | 93.6 |
| Comparative Example 2 | 97.8 | — | Al reflection-increasing film | 88.5 |
| Comparative Example 11 | 97.8 | AZO | Al reflection-increasing film | 88.6 |
| Comparative Example 12 | 97.8 | $TiO_2$ | Al reflection-increasing film | 88.5 |
| Comparative Example 13 | 97.8 | $Al_2O_3$ | Al reflection-increasing film | 88.5 |
| Comparative Example 14 | 97.8 | NiCr | Al reflection-increasing film | 88.4 |

As clear from the above results, the reflector of the present invention is produced by using a polymer base specified by the XPS measurement as described above, thereby enabling to achieve a very high reflectance. On the other hand, in a metal single-layered film, the surface composition of the polymer base has almost no effect on the reflectance. Accordingly, it is considered that an effect of the surface of the polymer base is specific to the reflector having a configuration of the present invention.

Furthermore, even with an underlying layer such as a metal, a metal oxide or the like formed between a reflective layer comprising a high refractive index layer (A), a low refractive index layer (B) and a metal layer (C), and a polymer base (D), it is surprisingly found that the surface composition of the polymer base has a great effect on the reflectance of the reflector. Therefore, it is considered very important to control the surface composition of the polymer base for increasing the reflectance of the reflector having a so-called reflection-increasing configuration of a high refractive index layer (A)/a low refractive index layer (B)/a metal layer(C).

The invention claimed is:

1. A reflector comprising a reflective layer having a laminate structure of at least a high refractive index layer (A), a low refractive index layer (B), and a metal layer (C) mainly composed of a metal selected from silver and aluminum; and a polymer base (D),
    wherein the layer (A), the layer (B) and the layer (C) are laminated in the order of (A)/(B)/(C), and
    wherein the polymer base (D) satisfies the following condition (I),
    (I) the content (Rn) of atoms of the same elements as elements (A2) in the atoms of elements (A1) is not less than 98.0 atomic %, wherein the elements (A1) are elements other than metals observed by an XPS (X-ray photoelectron spectroscopy) measurement at a portion at depths of 0 nm to 10 nm from a surface of the polymer base (D) in contact with the reflective layer, and the elements (A2) are elements other than metals observed by the XPS measurement at a portion at depths of 50 nm to 10 μm from the surface of the polymer base (D) in contact with the reflective layer.

2. The reflector according to claim 1, wherein the polymer base (D) is a polymer film.

3. A lamp reflector using the reflector as described in claim 1.

4. A reflector under a light-guiding plate using the reflector as described in claim 1.

5. A backlight device using the reflector as described in claim 1.

6. A liquid crystal display using the reflector as described in claim 1.

7. A method for producing a reflector comprising forming, on a polymer base (D1), a reflective layer having a laminate structure of a high refractive index layer (A), a low refractive index layer (B), and a metal layer (C) mainly composed of a metal selected from silver and aluminum, wherein the layer (A), the layer (B) and the layer (C) are laminated in the order of (A)/(B)/(C), and wherein the polymer base (D1) satisfies the following condition (II), (II) the content ($Rn_1$) of atoms of the same elements as elements (A21) in the atoms of elements (A11) is not less than 98.0 atomic %, wherein the elements (A11) are elements other than metals observed by an XPS (X-ray photoelectron spectroscopy) measurement at a surface of the polymer base (D1) in contact with the reflective layer, and the elements (A21) are elements other than metals observed by the XPS measurement at a portion at depths of 50 nm to 10 μm from the surface of the polymer base (D1) in contact with the reflective layer.

8. The method for producing the reflector according to claim 7, further comprising bringing the surface of the polymer base (D1) into contact with a liquid.

* * * * *